(12) United States Patent
Itoh et al.

(10) Patent No.: US 12,467,888 B2
(45) Date of Patent: Nov. 11, 2025

(54) PHASE ANALYZER, SAMPLE ANALYZER, AND ANALYSIS METHOD

(71) Applicant: JEOL Ltd., Tokyo (JP)

(72) Inventors: Kouta Itoh, Tokyo (JP); Atsuhiro Fujii, Tokyo (JP); Yuka Otake, Tokyo (JP)

(73) Assignee: JEOL Ltd., Tokyo (JP)

( * ) Notice: Subject to any disclaimer, the term of this patent is extended or adjusted under 35 U.S.C. 154(b) by 488 days.

(21) Appl. No.: 17/978,466

(22) Filed: Nov. 1, 2022

(65) Prior Publication Data

US 2023/0137130 A1 May 4, 2023

(30) Foreign Application Priority Data

Nov. 2, 2021 (JP) .................. 2021-179615

(51) Int. Cl.
*G01N 23/2208* (2018.01)
*G01N 23/2252* (2018.01)
(Continued)

(52) U.S. Cl.
CPC ..... *G01N 23/2208* (2013.01); *G01N 23/2252* (2013.01); *G06T 7/0004* (2013.01);
(Continued)

(58) Field of Classification Search
CPC ....... G01N 2223/402; G01N 2223/405; G01N 2223/423; G01N 2223/605; G01N 23/2208; G01N 23/2252; G06T 2207/10061; G06T 2207/10116; G06T 2207/20081; G06T 7/0004
See application file for complete search history.

(56) References Cited

U.S. PATENT DOCUMENTS

| | | | | |
|---|---|---|---|---|
| 5,866,903 A | * | 2/1999 | Morita | G01N 23/225 250/307 |
| 7,725,517 B1 | * | 5/2010 | Keenan | G01N 23/223 702/23 |

(Continued)

FOREIGN PATENT DOCUMENTS

| | | |
|---|---|---|
| JP | 201060389 A | 3/2010 |
| JP | 2018200270 A | 12/2018 |

OTHER PUBLICATIONS

Munch B, segmentation of elemental EDS maps by means of multiple clustering combined with phase identification, Sep. 2015, Journal of Microscopy, vol. 260, pp. 411-426. (Year: 2015).*

(Continued)

*Primary Examiner* — David J Makiya
*Assistant Examiner* — Soorena Kefayati
(74) *Attorney, Agent, or Firm* — The Webb Law Firm

(57) ABSTRACT

A phase analyzer includes a data acquisition unit that acquires spectrum imaging data in which a position on a sample is associated with a spectrum of a signal from the sample; a candidate determination unit that performs multivariate analysis on the spectrum imaging data to determine candidates for the number of phases; a phase analysis unit that creates, for each of the candidates, a phase map group including a number of phase maps corresponding to the number of phases; and a display control unit that causes a display unit to display, for each of the candidates, the phase map group.

7 Claims, 9 Drawing Sheets

(51) Int. Cl.
*G06T 7/00* (2017.01)
*G16C 20/80* (2019.01)
*H01J 37/26* (2006.01)

(52) U.S. Cl.
CPC ....... *G16C 20/80* (2019.02); *G01N 2223/402* (2013.01); *G01N 2223/423* (2013.01); *G01N 2223/605* (2013.01); *G06T 2207/10061* (2013.01); *G06T 2207/10116* (2013.01); *G06T 2207/20081* (2013.01); *H01J 37/26* (2013.01)

(56) References Cited

U.S. PATENT DOCUMENTS

| | | | | |
|---|---|---|---|---|
| 2006/0028643 | A1* | 2/2006 | Gottlieb | G01N 23/2206 356/300 |
| 2008/0027657 | A1* | 1/2008 | Rohde | G01N 23/225 702/28 |
| 2013/0240728 | A1* | 9/2013 | Albiol | H01J 49/44 250/305 |
| 2015/0362446 | A1* | 12/2015 | Kato | G01N 23/2252 250/306 |
| 2018/0342087 | A1* | 11/2018 | Katoh | G06T 11/008 |
| 2021/0033549 | A1* | 2/2021 | Wan | G06N 3/045 |

OTHER PUBLICATIONS

Extended European Search Report issued in EP22204564.3 on Feb. 24, 2023.

Pieter Botha and Hanna Horsch, Augmenting SEM-EDS Phase Classification using Data Projection and Cluster Analysis, Oct. 16, 2018, retrieved from the Internet at https://www.linkedin.com/pulse/augmenting-sem-eds-phase-classification-using-data-projection-botha.

Pieter Botha, Working with High-Dimensional Data Part 2: Classification by Cluster Analysis, Nov. 28, 2017, retrieved from the Internet at https://minassist.com.au/working-with-high-dimensional-data-part-2-classification-by-cluster-analysis.

Zhang et al., Curvature-based method for determining the number of clusters, Information Sciences, 2017, vol. 415, pp. 414-428.

Münch et al., Segmentation of elemental EDS maps by means of multiple clustering combined with phase idebtification, Journal of Microscopy, vol. 260, Issue 3, 2015, pp. 411-426.

* cited by examiner

| DATA No. | CLASSIFICATION NAME | SPECTRAL SHAPE | QUANTITATIVE RESULT |
|---|---|---|---|
| 1 | $SiO_2$ | | Si:47.3269%<br>O:52.6731% |
| 2 | SiC | | Si:68.9845%<br>C:31.0155% |
| 3 | $SiF_2$ | | Si:41.5124%<br>F:58.4876% |

⋮

| DATA No. | COMPOUND NAME | COMPOSITION |
|---|---|---|
| 1 | $SiO_2$ | Si:46.744559%<br>O:53.255441% |
| 2 | $Si_2O_3$ | Si:53.9235%<br>O:46.0765% |
| 3 | AlCu | Al:29.8048%<br>Cu:70.1952% |

| CANDIDATES FOR PHASE NAMES | CORRELATION COEFFICIENT |
|---|---|
| $SiF_2$ | 0.91 |
| $SiO_2$ | 0.82 |
| $Si_2O_3$ | 0.77 |

PHASE ANALYZER, SAMPLE ANALYZER, AND ANALYSIS METHOD

CROSS-REFERENCE TO RELATED APPLICATION

This application claims priority to Japanese Patent Application No. 2021-179615, filed on Nov. 2, 2021, the disclosure of which is hereby incorporated by reference in its entirety.

BACKGROUND OF THE INVENTION

Field of the Invention

The present invention relates to a phase analyzer, a sample analyzer, and an analysis method.

In a scanning electron microscope equipped with an X-ray detector such as an energy-dispersive X-ray spectrometer (EDS) or a wavelength-dispersive X-ray spectrometer (WDS), spectrum imaging data, in which a position on a sample and an X-ray spectrum are associated with each other, can be obtained. As a technique for determining a distribution of compounds by using spectrum imaging data, phase analysis is known.

Description of Related Art

For example, JP-A-2018-200270 discloses a phase analyzer in which a graph illustrating an X-ray intensity of each element and a concentration of each element by means of areas is displayed along with a phase map showing a distribution of compounds to facilitate understanding of characteristics of compositions of the compounds.

In phase analysis, good phase maps cannot be obtained unless an appropriate number of phases are set. For that reason, it is required to repeatedly perform phase analysis while changing conditions of the number of phases in order to find the appropriate number of phases.

SUMMARY OF THE INVENTION

A phase analyzer according to a first aspect of the invention includes:
- a data acquisition unit that acquires spectrum imaging data in which a position on a sample is associated with a spectrum of a signal from the sample;
- a candidate determination unit that performs multivariate analysis on the spectrum imaging data to determine candidates for the number of phases;
- a phase analysis unit that creates, for each of the candidates, a phase map group including a number of phase maps corresponding to the number of phases; and
- a display control unit that causes a display unit to display, for each of the candidates, the phase map group.

A sample analyzer according to a second aspect of the invention includes the above phase analyzer.

An analysis method according to a third aspect of the invention includes:
- acquiring spectrum imaging data in which a position on a sample is associated with a spectrum of a signal from the sample;
- performing multivariate analysis on the spectrum imaging data to determine candidates for the number of phases;
- creating, for each of the candidates, a phase map group including a number of phase maps corresponding to the number of phases; and
- causing a display unit to display, for each of the candidates, the phase map group.

BRIEF DESCRIPTION OF THE DRAWINGS

FIG. 8 is a table for describing a second database.

FIG. 9 is a table illustrating an example of a list of names of phases.

DESCRIPTION OF THE DRAWINGS

A phase analyzer according to an embodiment of the invention includes:
- a data acquisition unit that acquires spectrum imaging data in which a position on a sample is associated with a spectrum of a signal from the sample;
- a candidate determination unit that performs multivariate analysis on the spectrum imaging data to determine candidates for the number of phases;
- a phase analysis unit that creates, for each of the candidates, a phase map group including a number of phase maps corresponding to the number of phases; and
- a display control unit that causes a display unit to display, for each of the candidates, the phase map group.

In the phase analyzer, since the candidates for the number of phases are determined, and the phase map group including the number of phase maps corresponding to the number of phases is displayed on the display unit for each of the candidates for the number of phases, a user can easily obtain a good phase map group.

A sample analyzer according to an embodiment of the invention includes the above phase analyzer.

An analysis method according to an embodiment of the invention includes:
- acquiring spectrum imaging data in which a position on a sample is associated with a spectrum of a signal from the sample;
- performing multivariate analysis on the spectrum imaging data to determine candidates for the number of phases;
- creating, for each of the candidates, a phase map group including a number of phase maps corresponding to the number of phases; and causing a display unit to display, for each of the candidates, the phase map group.

In the analysis method, since the candidates for the number of phases are determined, and the phase map group including the number of phase maps corresponding to the number of phases is displayed on the display unit for each of the candidates for the number of phases, the user can easily obtain a good phase map group.

Preferred embodiments of the invention will be described in detail below with reference to the figures. It is noted that the embodiments described below do not unduly limit the scope of the invention described in the claims. In addition, all of the components described below are not necessarily essential requirements of the invention.

1. ANALYZER

Figure 1:
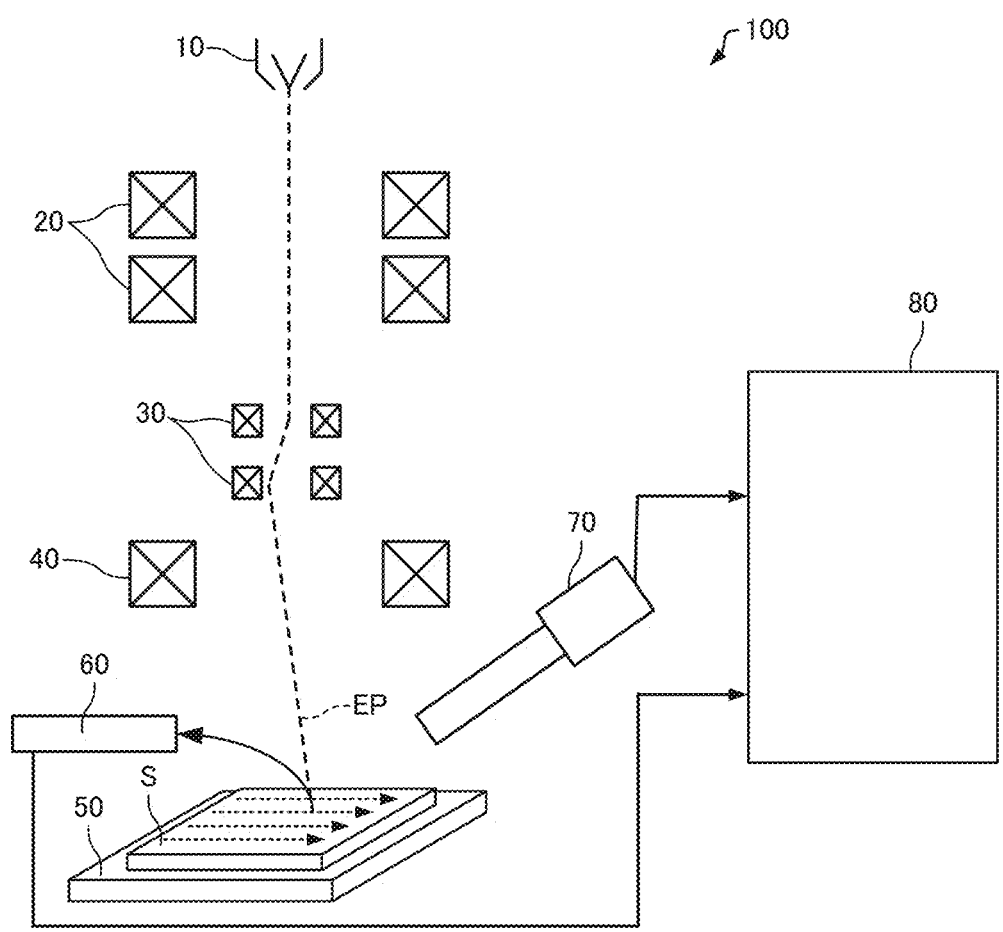
FIG. 1 is a diagram illustrating a configuration of a sample analyzer including a phase analyzer according to an embodiment of the invention.

First, a phase analyzer according to an embodiment of the invention will be described with reference to the figures. FIG. 1 is a diagram illustrating a configuration of a sample analyzer 100 including a phase analyzer 80 according to an embodiment of the invention.

The sample analyzer 100 is a scanning electron microscope equipped with an X-ray detector 70. In the sample analyzer 100, by scanning a sample S with an electron probe EP, spectrum imaging data in which a position on the sample S is associated with an X-ray spectrum can be acquired.

As illustrated in FIG. 1, the sample analyzer 100 includes an electron gun 10, a condenser lens 20, a scanning coil 30, an objective lens 40, a sample stage 50, a secondary electron detector 60, the X-ray detector 70, and the phase analyzer 80.

The electron gun 10 emits an electron beam. The electron gun 10, for example, accelerates electrons emitted from a cathode at an anode to emit the electron beam.

The condenser lens 20 and the objective lens 40 focus the electron beam emitted from the electron gun 10 to form the electron probe EP. A probe diameter and a probe current thereof can be controlled by the condenser lens 20.

The scanning coil 30 two-dimensionally deflects the electron probe EP. By two-dimensionally deflecting the electron probe EP with the scanning coil 30, the sample S can be scanned with the electron probe EP.

The sample stage 50 can hold the sample S. The sample stage 50 has a moving mechanism for moving the sample S.

The secondary electron detector 60 detects secondary electrons emitted from the sample S when the sample S is irradiated with the electron beam. The sample S is scanned by the electron probe EP, and the secondary electrons emitted from the sample S are detected by the secondary electron detector 60, so that a secondary electron image can be obtained. Also, the sample analyzer 100 may include a backscattered electron detector that detects backscattered electrons emitted from the sample S when the sample S is irradiated with the electron beam.

The X-ray detector 70 detects characteristic X-rays emitted from the sample S when the sample S is irradiated with the electron beam. The X-ray detector 70 is, for example, an energy-dispersive X-ray detector. Also, the X-ray detector 70 may be a wavelength-dispersive X-ray spectroscope. Spectrum imaging data can be obtained by scanning the sample S with the electron probe EP and detecting characteristic X-rays emitted from the sample S with the X-ray detector 70.

Spectrum imaging data is data in which positions (coordinates) on a sample and spectra of signals from the sample are associated with each other. In the sample analyzer 100, data in which positions on the sample S are associated with X-ray spectra can be obtained as the spectrum imaging data. In the sample analyzer 100, while the sample S is scanned with the electron probe EP, the X-ray spectra are collected for each pixel, and the positions on the sample S (coordinates of pixels) and the X-ray spectra are associated with each other and stored.

The phase analyzer (information processing device) 80 performs phase analysis using the spectrum imaging data and displays phase maps.

Figure 2:
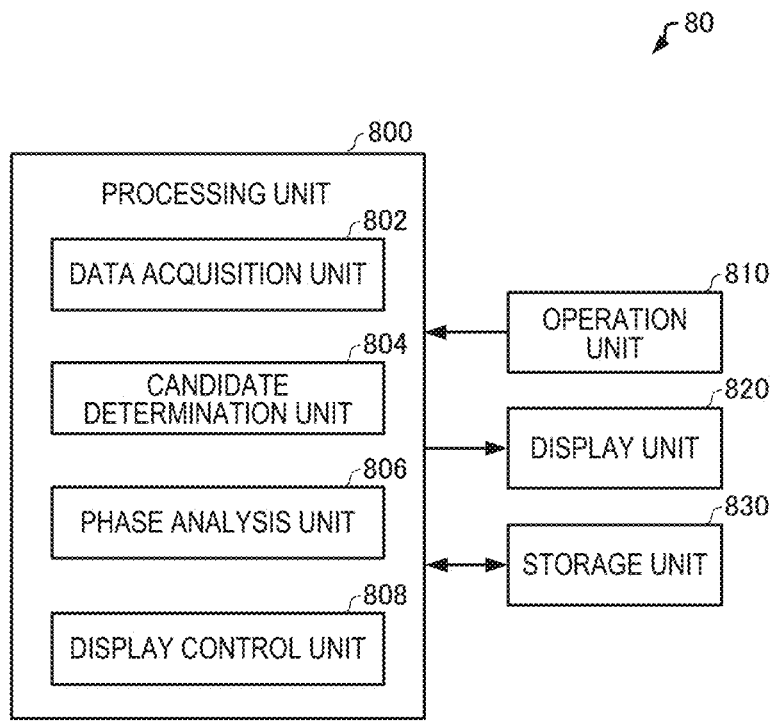
FIG. 2 is a diagram illustrating a configuration of the phase analyzer according to an embodiment of the invention.

FIG. 2 is a diagram illustrating a configuration of the phase analyzer 80.

As illustrated in FIG. 2, the phase analyzer 80 includes a processing unit 800, an operation unit 810, a display unit 820, and a storage unit 830.

The operation unit 810 is used by a user to input operation information and outputs input operation information to the processing unit 800. Functions of the operation unit 810 can be implemented by input devices such as a keyboard, a mouse, buttons, a touch panel, and a touch pad.

The display unit 820 is for displaying images generated by the processing unit 800, and its functions can be realized by a display such as a liquid crystal display (LCD) or a cathode ray tube (CRT). The display unit 820 displays a graphical user interface (GUI) screen for inputting phase analysis conditions, displaying phase analysis results, and analyzing and editing the phase analysis.

The storage unit 830 stores programs and various data for causing a computer to function as each part of the processing unit 800. In addition, the storage unit 830 also functions as a work area for processing unit 800. Functions of the storage unit 830 can be realized by a hard disk, a random access memory (RAM), or the like.

The processing unit 800 executes the programs stored in the storage unit 830, and thus functions as a data acquisition unit 802, a candidate determination unit 804, a phase analysis unit 806, and a display control unit 808, which will be described below. Functions of the processing unit 800 can be realized by executing a program using hardware such as various processors (a CPU, a DSP, etc.) and ASIC (a gate array, etc.). The processing unit 800 includes the data acquisition unit 802, the candidate determination unit 804, the phase analysis unit 806, and the display control unit 808.

The data acquisition unit 802 acquires the spectrum imaging data obtained by analyzing the sample S with the sample analyzer 100.

The candidate determination unit 804 performs multivariate analysis on the spectrum imaging data to determine candidates for the number of phases. The candidate determination unit 804 obtains priority of the number of phases based on results of the multivariate analysis and determines the candidates for the number of phases based on the priority.

The phase analysis unit 806 creates phase map groups each including a number of phase maps corresponding to the number of phases for each of the candidates for the number of phases determined by the candidate determination unit 804. The phase map groups can be created by performing the multivariate analysis on spectrum imaging data. A phase map is an image that shows a distribution of compounds.

The display control unit 808 causes the display unit 820 to display the phase map groups for each of the candidates for the number of phases.

2. ANALYSIS METHOD

2.1. Acquisition of Spectrum Imaging Data

The data acquisition unit 802 acquires the spectrum imaging data obtained by analyzing the sample S with the sample analyzer 100. In the sample analyzer 100, the sample S is scanned with the electron probe EP to detect the X-rays emitted from the sample S with the X-ray detector 70, and the X-ray spectrum data is acquired at each detected position. The detected positions (coordinates on the sample S) and the X-ray spectrum data are associated with each other and stored. Thus, the spectrum imaging data can be obtained.

2.2. Determination of Candidates for the Number of Phases

The candidate determination unit 804 analyzes the spectrum imaging data and extracts coordinate groups (pixel groups) having similar spectra. For example, multivariate analysis is used to analyze the spectrum imaging data. As the multivariate analysis, methods such as self-organizing maps (SOM), a hierarchical clustering method, a K-means method, principal component analysis, singular value decomposition, non-negative matrix decomposition, vertex component analysis, and the like can be exemplified. Also, these techniques may be combined to extract the coordinate groups having similar spectra.

The candidate determination unit 804 performs the multivariate analysis to determine the candidates for the number of phases (the number of coordinate groups having similar spectra).

The phase analysis unit 806, for example, performs cluster analysis on the spectrum imaging data to determine candidates for the number of phases. Cluster analysis is a type of multivariate analysis and is unsupervised learning of collecting similar data in data groups and classifying it. Here, as the cluster analysis, a case of determining candidates for the number of phases by combining the self-organizing maps and a hierarchical clustering method will be described.

The candidate determination unit 804 first creates the self-organizing maps of the spectrum imaging data. The candidate determination unit 804 learns the self-organizing maps using spectrum data of each pixel constituting the spectrum imaging data as input vectors. This creates a map space that associates the input vectors with each other. In the map space, a degree of similarity of spectrum data is represented by a distance on a map. The candidate determination unit 804 sorts the spectrum data into groups based on the distance on the map space and creates clusters. A cluster is a collection of similar input vectors (spectrum data).

The candidate determination unit 804 uses the clusters obtained using the self-organizing maps as minimum unit clusters and merges the minimum unit clusters using a hierarchical clustering method to create new clusters.

Figure 3:
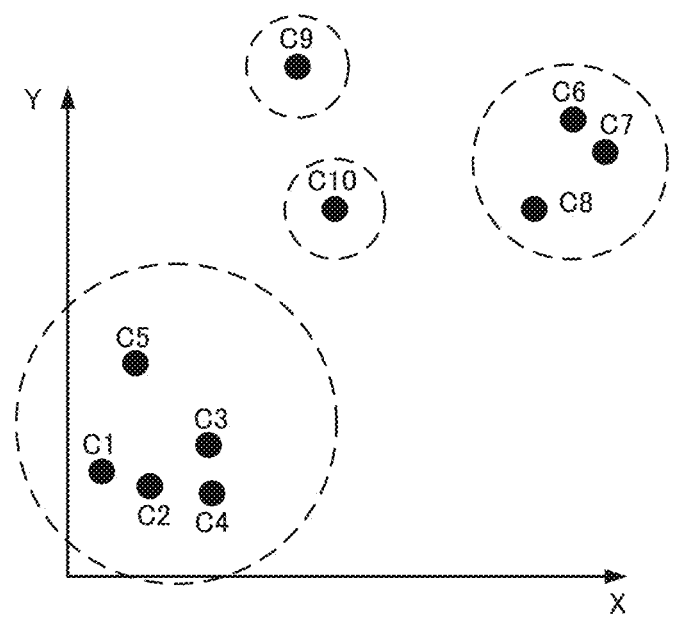
FIG. 3 is a diagram for describing a hierarchical clustering method.
Figure 4:
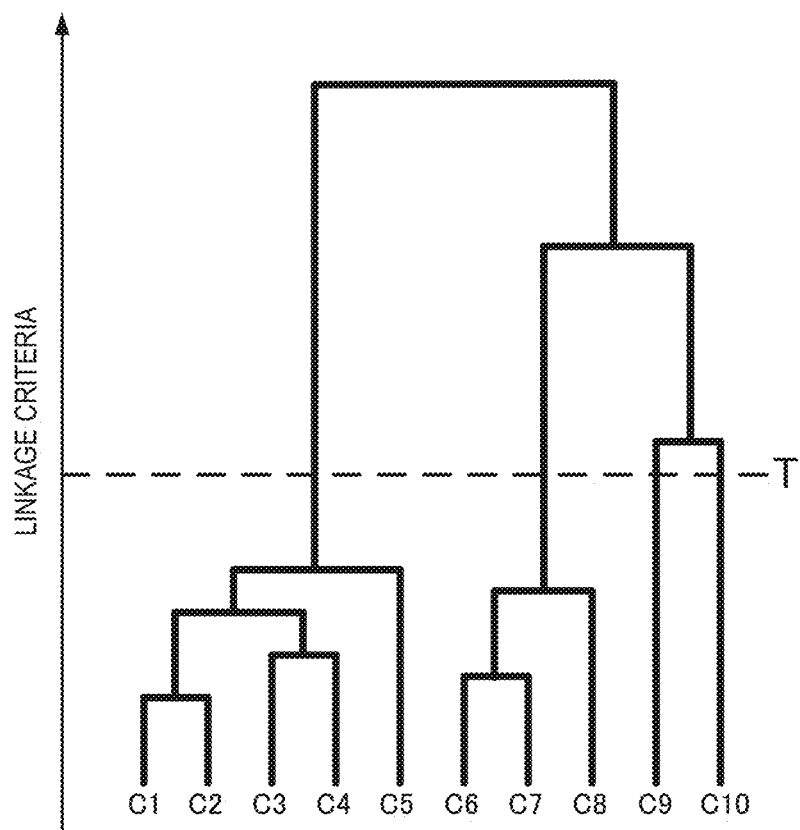
FIG. 4 is a diagram for describing a hierarchical clustering method.

FIGS. 3 and 4 are diagrams for describing the hierarchical clustering method.

As illustrated in FIGS. 3 and 4, the candidate determination unit 804 merges the minimum unit clusters C1, C2, C3, C4, C5, C6, C7, C8, C9, and C10 obtained from the self-organizing maps using the hierarchical clustering method to create new clusters.

Specifically, the candidate determination unit 804 obtains distances (dissimilarities) between the minimum unit clusters C1, C2, C3, C4, C5, C6, C7, C8, C9, and C10 and merges combinations thereof in descending order of the distance. A process of merging can be represented by a dendrogram. A distance required to merge two clusters is referred to as a linkage criterion.

As illustrated in FIG. 4, new clusters can be created by cutting the dendrogram at a threshold T. In the hierarchical clustering method, by adjusting the threshold T, any number of clusters can be created. In the illustrated example, by cutting the dendrogram at the threshold T, four clusters are created.

Figure 5:
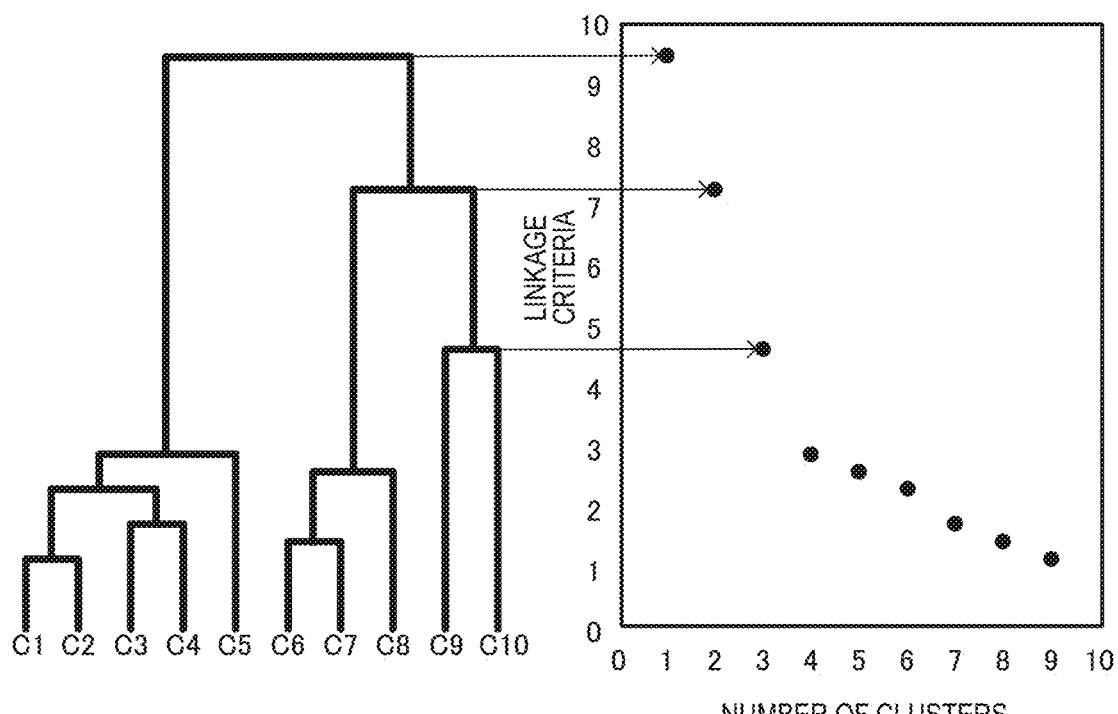
FIG. 5 is a graph illustrating a relationship between the number of clusters and linkage criteria.

FIG. 5 is a graph illustrating a relationship between the number of clusters and linkage criteria.

The candidate determination unit 804 obtains the linkage criteria between the minimum unit clusters C1, C2, C3, C4, C5, C6, C7, C8, C9, and C10 and creates the graph (function) indicating the relationship between the number of clusters and the linkage criteria illustrated in FIG. 5.

Figures 6, 7:
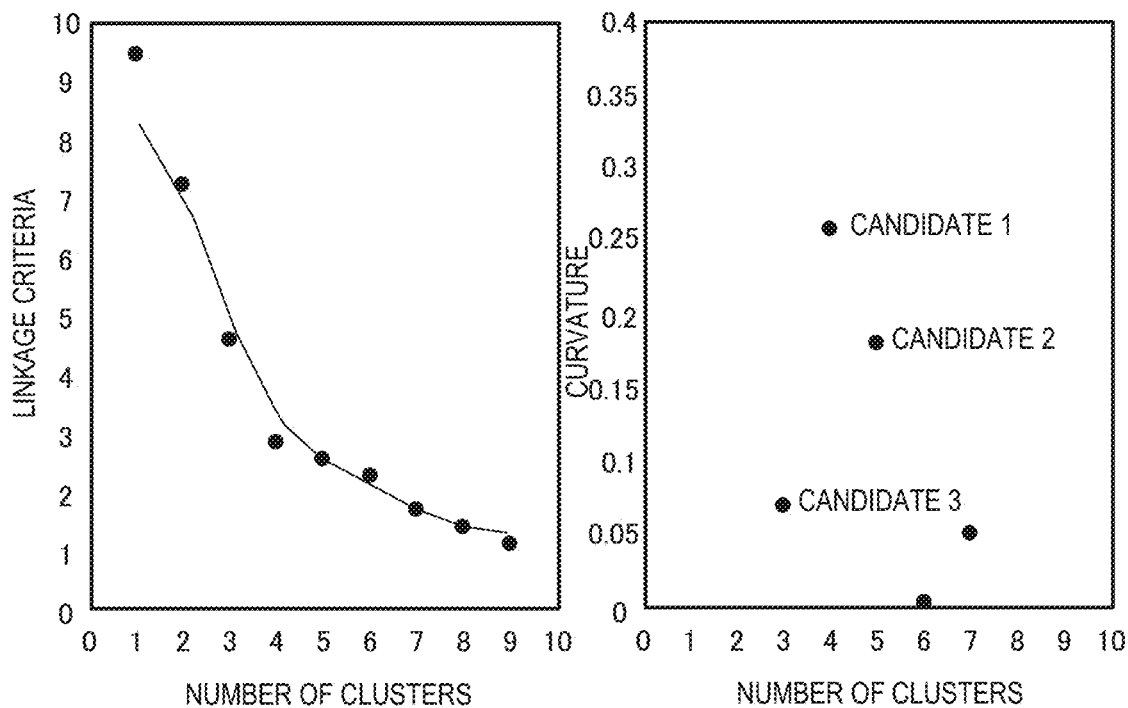
FIG. 6 is a graph illustrating a relationship between the number of clusters and curvatures.
FIG. 7 is a table for describing a first database.

FIG. 6 is a graph illustrating a relationship between the number of clusters and curvatures.

The candidate determination unit 804 creates the graph indicating the relationship between the number of clusters and the curvatures as illustrated in FIG. 6 from the graph indicating the relationship between the number of clusters and the linkage criteria as illustrated in FIG. 5. Here, the curvature is a curvature at an arbitrary point of the function indicating the relationship between the number of clusters and the linkage criteria. A curvature R at a point (a, f(a)) of y=f(x) can be obtained by the following formula.

$$R = \frac{(1 + f'(a)^2)^{\frac{3}{2}}}{|f''(a)|}$$

The candidate determination unit 804 obtains the curvatures for each number of clusters and determines priority based on the curvatures. The priority can be expressed, for example, as a ratio of the largest curvature among the curvatures obtained for each number of clusters as a reference. The greater the curvature, the higher the priority.

In the example illustrated in FIG. 6, since the curvature is the largest in a case in which the number of clusters is "4," it has the highest priority and is selected as a candidate 1. Also, since the curvature is the second largest in a case in which the number of clusters is "5," it has the second highest priority and is selected as a candidate 2. In addition, since the curvature is the third largest in a case in which the number of clusters is "3," it has the third highest priority and is selected as a candidate 3.

From these results, the candidate determination unit 804 determines the case in which the number of phases is 4, the case in which the number of phases is 5, and the case in which the number of phases is 3 as candidates.

Here, the candidate determination unit 804 determines only the number of clusters with higher priority than a preset reference value of priority as candidates. For that reason, the case in which the number of clusters is "7" has the fourth largest curvature, but the priority is lower than the preset reference value, and thus it is excluded from the candidates.

Also, for example, the candidate determination unit 804 may list a preset number of candidates for the number of phases. That is, in a case in which the number of candidates is set to three in advance, the candidate determination unit 804 lists three candidates for the number of phases in descending order of priority.

2.3. Phase Analysis

The phase analysis unit 806 creates the phase map groups each including a number of phase maps corresponding to the determined number of phases for each of the candidates for the number of phases determined by the candidate determination unit 804.

In the example illustrated in FIG. 6, the candidate determination unit 804 has determined the case in which the number of phases is four, the case in which the number of phases is five, and the case in which the number of phases is three as the candidates. For that reason, the phase analysis unit 806 performs the phase analysis under the condition that the number of phases is four and creates a phase map group including four phase maps. Similarly, the phase analysis unit 806 performs the phase analysis under the condition that the number of phases is five and creates a phase map group including five phase maps. Further, the phase analysis unit 806 performs the phase analysis under the condition that the number of phases is three and creates a phase map group including three phase maps.

The phase analysis unit 806 further creates a phase spectrum from each phase map that constitutes the phase map groups. A phase spectrum is a spectrum obtained by averaging (or integrating) spectra of all pixels that constitute a phase map. Further, the phase analysis unit 806 performs a process of naming a phase for each phase map and a process of obtaining an area fraction of each phase (a ratio of an area of each phase to an area of the entire map).

A phase name is determined using two databases (a first database and a second database). Here, a case in which a compound name is used as a phase name will be described.

FIG. 7 is a table for describing the first database, and FIG. 8 is a table for describing the second database.

In the first database, as illustrated in FIG. 7, classification names (compound names), spectrum data, and quantitative results are registered. The first database may be created by registering spectra acquired by the user, or may be a publicly available or commercially available spectrum database. A classification name is a compound name assumed from a quantitative result. Spectrum data is data of a acquired X-ray spectrum. The quantitative result is a result of performing quantitative calculation on the acquired spectrum. For example, in the first database, as data No. 1, $SiO_2$ is registered as a classification name, $SiO_2$ spectrum data is registered as data of a spectral shape, and Si: 47.3269% and O: 52.6731% are registered as a quantitative result.

In the second database, as illustrated in FIG. 8, compound names and composition information are registered. Composition information is calculated from a compound name. For example, in the second database, as data No. 1, $SiO_2$ is registered as a compound name, and Si: 46.744559% and O: 53.255441% are registered as composition information.

The phase analysis unit 806 obtains a correlation coefficient between a phase spectrum obtained from a phase map serving as a naming target and each piece of spectral data registered in the first database. For example, a correlation coefficient between data x and data y can be obtained by the following equations.

$$Cor = \frac{\sum_i (x_i - \bar{x})(y_i - \bar{y})}{\sqrt{\sum_i (x_i - \bar{x})^2} \sqrt{\sum_i (y_i - \bar{y})^2}}$$

$$\bar{x} = \frac{\sum_i x_i}{N}$$

Here, "i" is a channel of data and "N" is the number of pieces of data.

The phase analysis unit 806 finds spectral data with the largest correlation coefficient from all spectral data registered in the first database.

In addition, the phase analysis unit 806 performs quantitative calculation on the phase spectrum obtained from the phase map serving as the naming target and determines a correlation coefficient between the quantitative result and each quantitative result registered in the first database. The phase analysis unit 806 finds a quantitative result with the largest correlation coefficient among all the quantitative results registered in the first database.

The phase analysis unit 806 compares the correlation coefficient of the spectrum data with the largest correlation coefficient to the correlation coefficient of the quantitative result with the largest correlation coefficient and adopts the larger correlation coefficient as candidate data in the first database.

Also, the phase analysis unit 806 may obtain only the correlation coefficient with the spectrum data and adopt the spectrum data with the largest correlation coefficient as the candidate data in the first database. Similarly, only the correlation coefficients with the quantitative results may be obtained, and the quantitative result with the largest correlation coefficient may be adopted as the candidate data in the first database. In this case, it is assumed that it is set in advance whether to use the spectral data or the quantitative results.

The phase analysis unit 806 performs quantitative calculation on a phase spectrum obtained from a phase map serving as the naming target and calculates a correlation coefficient between a quantitative result and each piece of composition information registered in the second database. The phase analysis unit 806 finds the quantitative result with the largest correlation coefficient among all the quantitative results registered in the second database and adopts it as candidate data in the second database.

The phase analysis unit 806 compares the correlation coefficient of the candidate data in the first database with the correlation coefficient of the candidate data in the second database and selects the data with the larger correlation coefficient. Then, a compound name registered in the selected data is adopted as a phase name.

Also, the candidates in the first database (or the second database) may be adopted as phase names without comparing the candidates in the first database with the candidates in the second database. In this case, it is assumed that the database to be used is set in advance.

Also, phase names may be input directly by the user. In addition, as illustrated in FIG. 9, the phase analysis unit 806 extracts compound names from the first database and the second database in descending order of correlation coefficient to create a list, and the user may select compound names from this list as phase names. Further, for example, when the user inputs a character string, compound names including the input character string may be extracted from the list in FIG. 9. This makes it possible to easily determine the compound names.

2.4. Display

The display control unit 808 causes the display unit 820 to display the number of phases and the phase map groups for each of the candidates for the number of phases. The display control unit 808 displays the phase map groups in descending order of priority. The display control unit 808 displays, for example, the phase map groups on a preview screen 2 for displaying candidates of the phase map groups.

Figure 10:
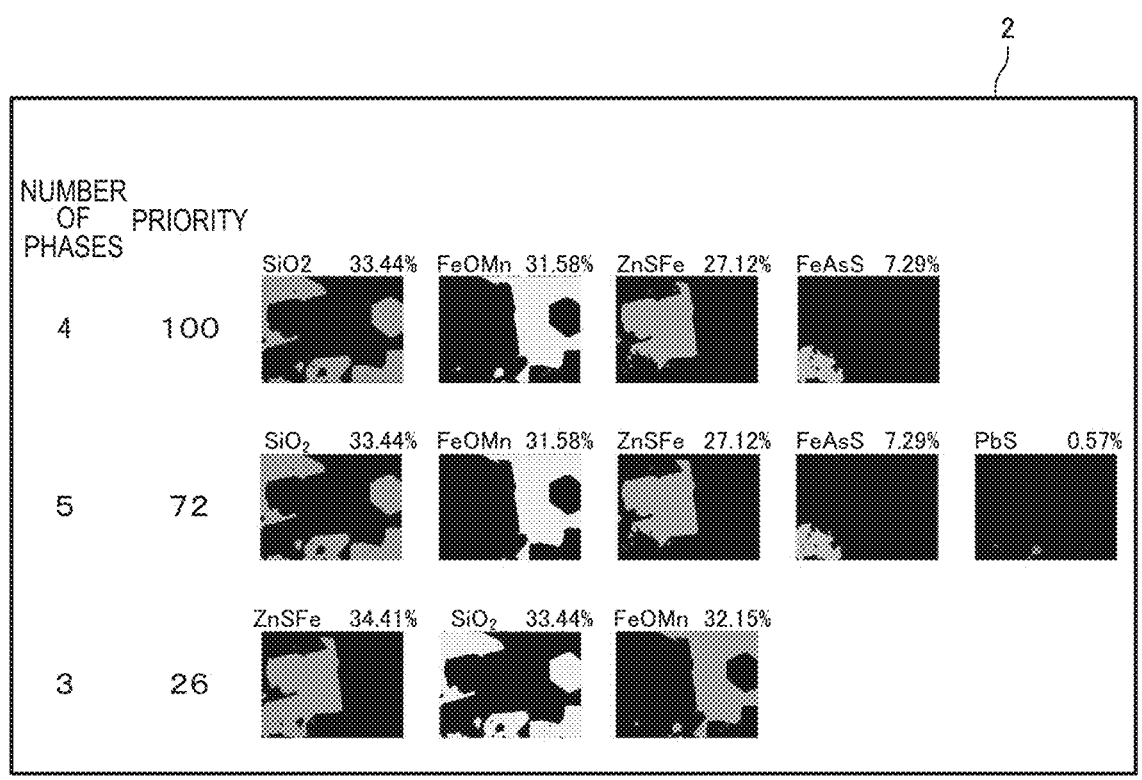
FIG. 10 is a diagram illustrating an example of a preview screen for displaying phase map group candidates.

FIG. 10 is a diagram illustrating an example of a preview screen 2 for displaying phase map group candidates.

The display control unit 808 displays the phase analysis results performed by the phase analysis unit 806 described above on the preview screen 2 illustrated in FIG. 10.

The preview screen 2 in FIG. 10 displays a phase map group in which the number of phases is four, a phase map group in which the number of phases is five, and a phase map group in which the number of phases is three. These three phase map groups are arranged in descending order of priority.

In addition, the display control unit 808 displays the compound names (phase names) and each area fraction. As the compound names, compound names determined by the phase analysis unit 806 or compound names input by the user are displayed. Although not shown, the preview screen 2 may display information for the user to select phase map groups, such as phase spectra, a dendrogram, and the like, in addition to the above-described phase names and area fractions.

Figure 11:
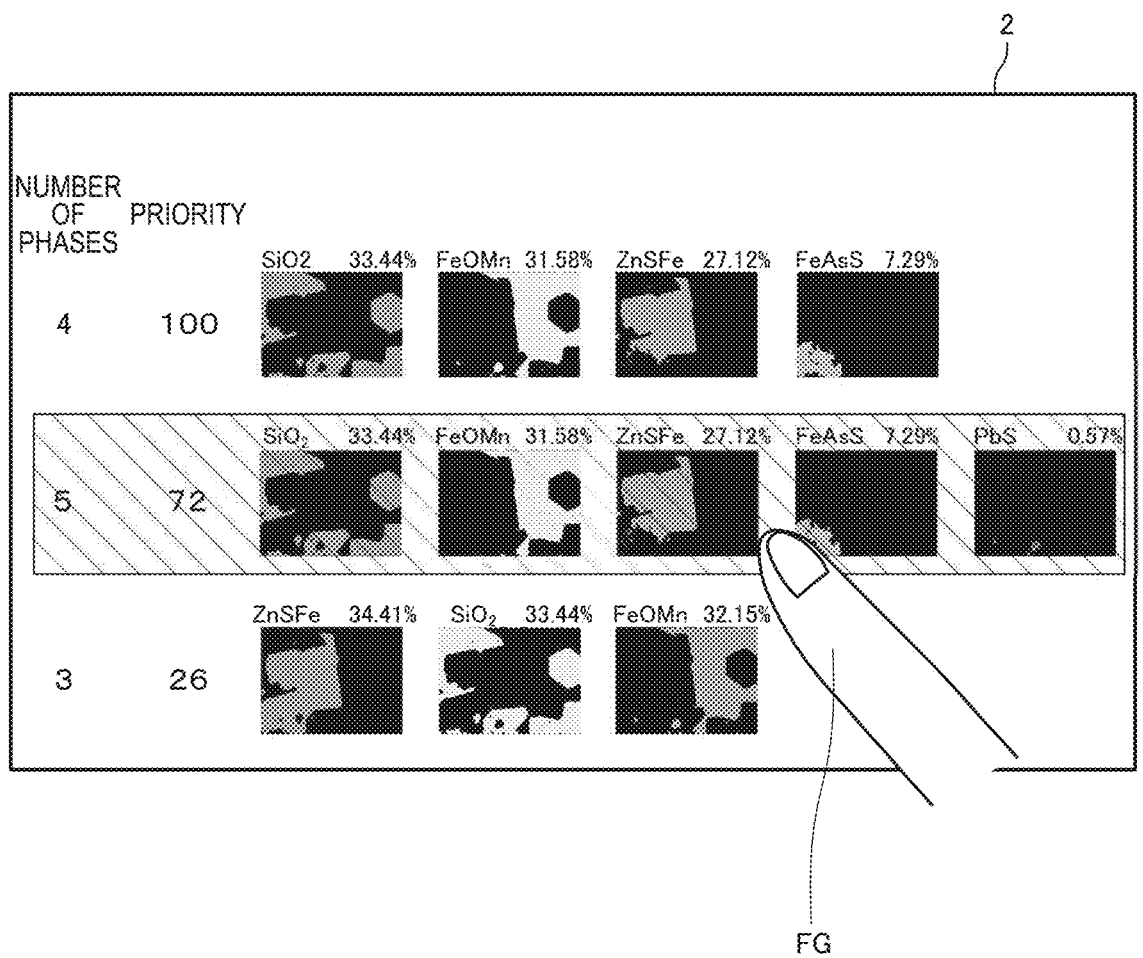
FIG. 11 is a diagram schematically illustrating a state in which one phase map group is selected on the preview screen.

FIG. 11 is a diagram schematically illustrating a state in which one phase map group is selected on the preview screen 2.

On the preview screen 2, the user can select one phase map group from a plurality of phase map group candidates displayed. For example, in a case in which the display unit 820 includes a touch panel (an example of the operation unit 810), the user performs an operation of touching a desired phase map group with a fingertip FG, so that the user can select one phase map group from the plurality of phase map groups displayed on the preview screen 2. Also, the phase map group may be selected by operating a mouse or keyboard.

When the user selects a desired phase map group on the preview screen 2, the display control unit 808 displays the selected phase map group on the GUI screen.

Figure 12:
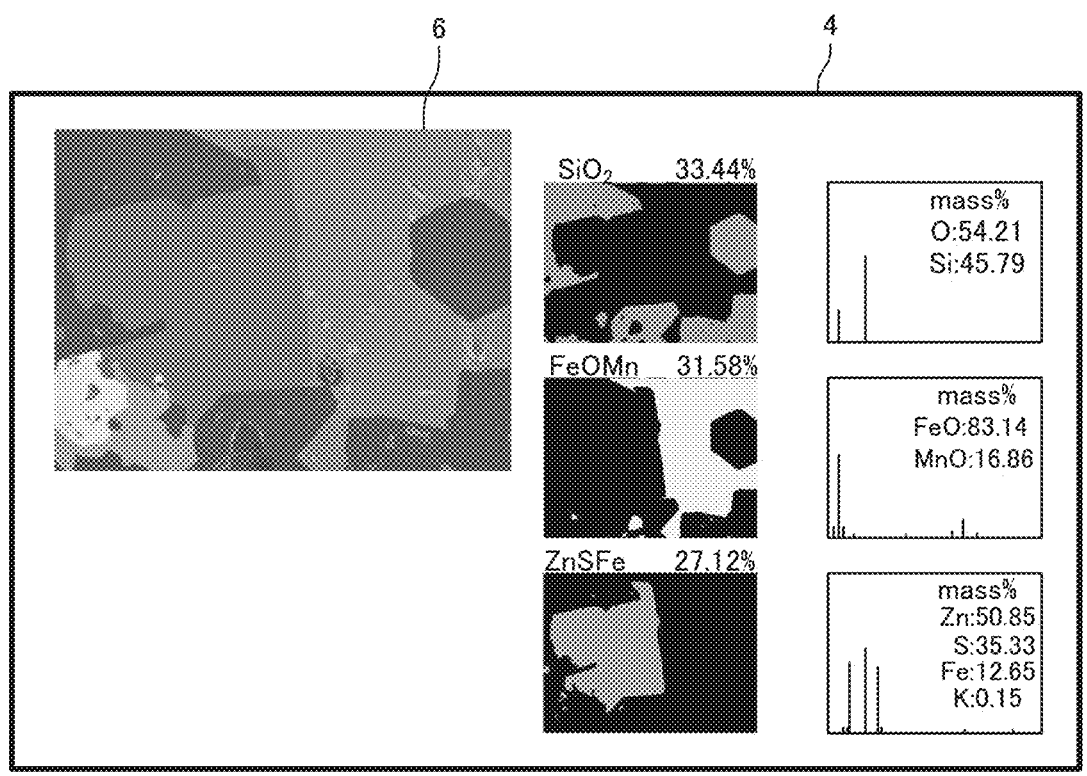
FIG. 12 is a diagram illustrating an example of a GUI screen.

FIG. 12 is a diagram illustrating an example of a GUI screen 4.

On the GUI screen 4, it is possible to analyze and edit each phase map that constitutes the selected phase map group. The GUI screen 4 displays a plurality of phase maps that constitute the phase map group, names of each phase, area fractions of each phase, and quantitative results thereof. Further, in a region 6 of the GUI screen 4, an image obtained by combining each phase map and a SEM image is displayed.

On the GUI screen 4, analysis and editing such as qualitative and quantitative analysis of phase spectra, phase combining or uncombining, phase color changes, phase name changes, and the like can be performed.

On the GUI screen 4, the qualitative and quantitative analysis of phase spectra can be performed under various conditions. By performing the qualitative and quantitative analysis of phase spectra, phases can be renamed and compared to other phases.

On the GUI screen 4, a plurality of phase maps can be combined to form one phase map. For example, phase maps with similar distributions can be combined into one phase map, or a plurality of phases with similar compositions can be combined into one phase to create a phase map. In addition, phases (edge phases) that form edges of other phases can be grouped into one phase map. Here, in the phase map, there are cases where two phases cannot be separated at a boundary of the two phases and another phase seems to be present at the boundary between the two phases. Another phase present on the boundary between these two phases is referred to as an edge phase. This edge phase does not actually exist, and thus in a case in which there are a plurality of edge phases, the plurality of edge phases are combined into one.

On the GUI screen 4, colors of phase maps selected by the user can be changed to desired colors. This makes it easier to see the phase maps.

Also, on the GUI screen 4, phase names can be changed. For example, phase names may be changed based on results of the qualitative and quantitative analysis of phase spectra.

3. OPERATIONS OF THE PHASE ANALYZER

Figure 13:
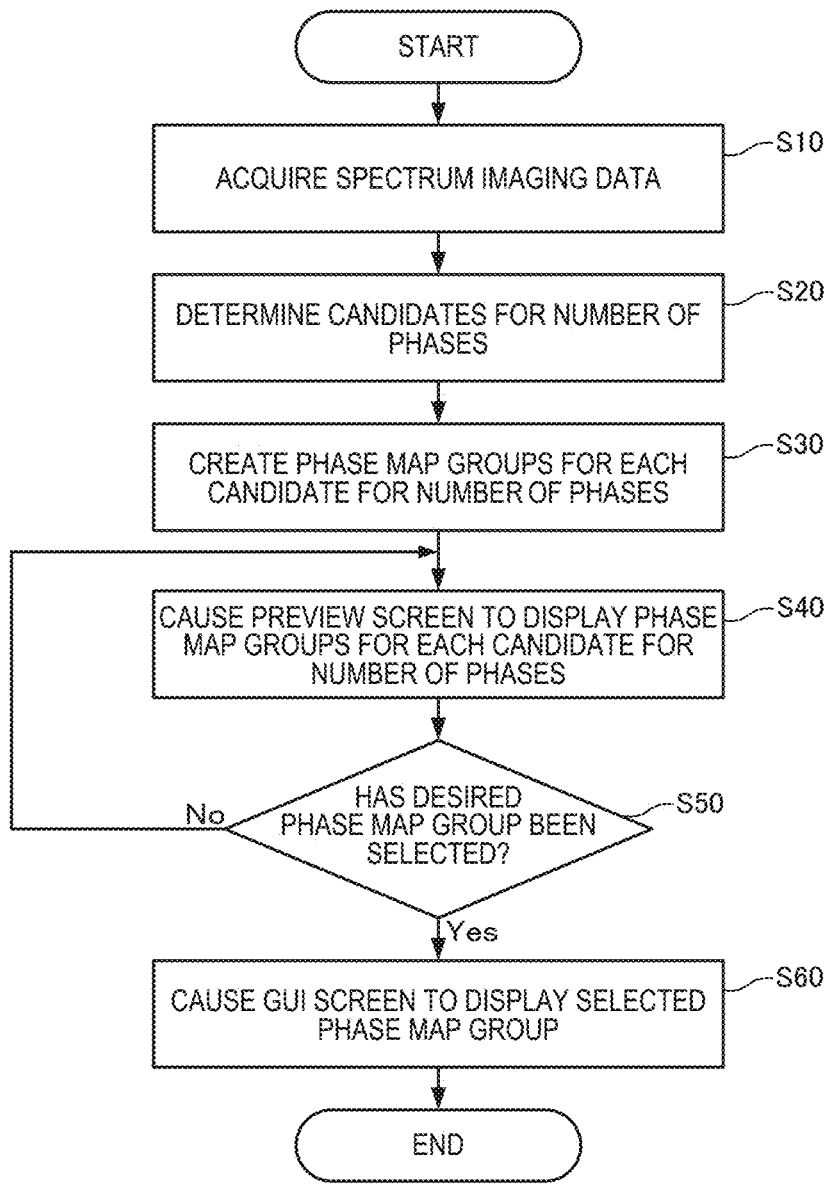
FIG. 13 is a flowchart illustrating an example of a process of a phase analyzer according to an embodiment of the invention.

FIG. 13 is a flowchart illustrating an example of a process of the phase analyzer 80.

When the sample analyzer 100 collects signals from the sample S, the data acquisition unit 802 acquires spectrum imaging data (S10).

The candidate determination unit 804 performs the multivariate analysis on the spectrum imaging data to determine the candidates for the number of phases (S20).

Specifically, first, the candidate determination unit 804 creates self-organizing maps of spectrum imaging data and creates minimum unit clusters. Next, the candidate determination unit 804 creates new clusters by merging the minimum unit clusters using a hierarchical clustering method. In this case, the candidate determination unit 804 determines candidates for the number of clusters, that is, candidate for the number of phases based on the curvatures of the function indicating the relationship between the number of clusters and the linkage criteria as illustrated in FIG. 6.

The phase analysis unit 806 creates phase map groups including a number of phase maps corresponding to the determined number of phases for each candidate for the number of phases determined by the candidate determination unit 804 (S30). In addition to the phase map groups, the phase analysis unit 806 obtains the compound names (phase names), the area fractions of phases, and the phase spectra. Further, the phase analysis unit 806 performs the qualitative and quantitative analysis on the phase spectra.

As illustrated in FIG. 10, the display control unit 808 causes the display unit 820 to display the preview screen 2 in which the number of phases and the phase map groups are displayed for each candidate for the number of phases (S40).

In a case in which a desired phase map group is selected from a plurality of phase map groups displayed on the preview screen 2 (Yes in S50), the display control unit 808 displays the selected phase map group on the GUI screen 4 (S60). Thus, it is possible to analyze and edit the phase maps. After the selected phase map group is displayed on the GUI screen 4, the processing unit 800 ends the process of displaying the phase map groups.

4. EFFECTS

The phase analyzer 80 includes the data acquisition unit 802 that acquires the spectrum imaging data, the candidate determination unit 804 that performs the multivariate analysis on the spectrum imaging data to determine candidates for the number of phases, the phase analysis unit 806 that creates the phase map groups including a number of phase maps corresponding to the number of phases for each of the candidates for the number of phases, and the display control unit 808 that causes the display unit 820 to display the phase map groups for each of the candidates for the number of phases. For that reason, the phase analyzer 80 determines the candidates for the number of phases and causes the display unit 820 to display the phase map groups including a number of phase maps corresponding to the number of phases for each of the candidates for the number of phases, so that the user can easily obtain a good phase map group. For example, in a case in which the user specifies the number of phases and obtains the phase map groups, the user had to repeat an operation to change the number of phases and obtain the phase map groups in order to obtain a good phase map group. On the other hand, since the phase analyzer 80 can display a plurality of phase map groups with mutually different numbers of phases on the display unit 820, the user can easily obtain a good phase map group simply by selecting one from the plurality of phase map groups. In addition, since the plurality of phase map groups are displayed at the same time, it is easy to compare the phase map groups.

Further, in the phase analyzer 80, the preview screen 2 displaying the plurality of phase map groups displays various information (priority, area fractions, compound names, phase spectra, qualitative and quantitative results, etc.) for determining whether or not the phase map groups are appropriate. For that reason, the user can easily determine whether or not the phase map groups are appropriate.

In the phase analyzer 80, the candidate determination unit 804 obtains the priority of the number of phases based on the results of the multivariate analysis and determines the candidates for the number of phases based on the priority. For that reason, in the phase analyzer 80, the user can easily specify the number of phases.

In the phase analyzer 80, the phase analysis unit 806 determines the compound names based on each of the phase maps that constitute the phase map groups, and the display control unit 808 causes the display unit 820 to display the compound names. Here, when determining whether or not the phase maps are appropriate, the compound names are important information. Since the compound names are displayed together with the phase maps in the phase analyzer 80, the user can easily determine whether or not the phase map groups are appropriate.

In the phase analyzer 80, the phase analysis unit 806 obtains the area fraction of each phase based on each of the phase maps that constitute the phase map groups, and the display control unit 808 causes the display unit 820 to display the area fraction of each phase. For that reason, the phase analyzer 80 can obtain information on the area fraction of each phase.

Since the sample analyzer 100 includes the phase analyzer 80, the user can easily obtain good phase maps.

5. MODIFIED EXAMPLES

5.1. First Modified Example

In the above-described embodiment, the candidates for the number of phases have been determined in descending order of the curvatures of the function indicating the relationship between the number of clusters and the linkage criteria. For example, in the example illustrated in FIG. 6, the case in which the number of phases is four, the case in which the number of phases is five, and the case in which the number of phases is three have been determined as the candidates in descending order of the curvatures.

The method for determining the candidates for the number of phases is not limited to the above embodiment. For example, after the multivariate analysis is performed to determine the number of phases with the highest priority, a number obtained by adding 1 to and subtracting 1 from the number of phases with the highest priority may be used as candidates for the number of phases. In the example illustrated in FIG. 6, first, the case in which the number of phases with the largest curvature is four is determined as a candidate, and then the case in which the number of phases is five (4+1) and the number of phases is three (4−1) is determined as a candidate.

In addition, when five candidates for the number of phases are listed, a number obtained by adding 2 to and a number obtained by subtracting 2 from the number of phases with the highest priority may be determined as candidates.

5.2. Second Modified Example

In the above-described embodiment, the case in which the sample analyzer 100 is a scanning electron microscope equipped with the X-ray detector 70 has been described, but the analyzer according to the invention is not limited thereto. For example, the analyzer according to the invention may be any device that can obtain spectra of signals (X-rays, electrons, ions, etc.) from the sample S. The analyzer according to the invention is a transmission electron microscope equipped with an energy-dispersive X-ray spectrometer or a wavelength-dispersive X-ray spectrometer, an electron probe microanalyzer, an Auger microprobe, a photoelectron spectrometer, a focused ion beam device, or the like.

Also, the above-described embodiments and modified examples are merely examples, and the invention is not limited thereto. For example, the embodiments and modified examples can be combined as appropriate.

The invention is not limited to the above-described embodiments, and various modifications are possible. For example, the invention includes configurations that are substantially the same as the configurations described in the embodiments. Substantially same configurations mean configurations having the same functions, methods and results, or configurations having the same objectives and effects as those of the configurations described in the embodiments, for example. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

As described above, some embodiments of the invention have been described in detail, but a person skilled in the art will readily appreciate that various modifications can be made from the embodiments without materially departing from the novel teachings and effects of the invention. Accordingly, all such modifications are assumed to be included in the scope of the invention.

The invention claimed is:

1. A phase analyzer comprising:
   a data acquisition unit configured to acquire spectrum imaging data in which a position on a sample is associated with a spectrum of a signal from the sample;
   a candidate determination unit configured to perform multivariate analysis on the spectrum imaging data to determine candidates for a number of phases;
   a phase analysis unit configured to create, for each of the candidates, a phase map group comprising a number of phase maps corresponding to the number of phases; and a display control unit configured to cause a display unit to display, for each of the candidates, the phase map group, wherein the candidate determination unit determines a priority of the number of phases based on results of the multivariate analysis, and the candidate determination unit determines the candidates based on the priority of the number of phases.

2. The phase analyzer according to claim 1, wherein
the display control unit causes the display unit to display the priority of each of the candidates.

3. The phase analyzer according to claim 1, wherein
the phase analysis unit determines a compound name based on each of the phase maps that constitute the phase map group, and
the display control unit causes the display unit to display the determined compound name.

4. The phase analyzer according to claim 1, wherein
the phase analysis unit determines an area fraction of a phase based on each of the phase maps that constitute the phase map group, and
the display control unit causes the display unit to display the area fraction of a phase.

5. A sample analyzer comprising the phase analyzer according to claim 1.

6. A phase analyzer comprising:
a data acquisition unit configured to acquire spectrum imaging data in which a position on a sample is associated with a spectrum of a signal from the sample;
a candidate determination unit configured to perform multivariate analysis on the spectrum imaging data to determine candidates for a number of phases;
a phase analysis unit configured to create, for each of the candidates, a phase map group comprising a number of phase maps corresponding to the number of phases; and
a display control unit configured to cause a display unit to display, for each of the candidates, the phase map group, wherein
the candidate determination unit is configured to:
perform cluster analysis on the spectrum imaging data and classifies the spectrum imaging data into a plurality of minimum unit clusters,
determine a function indicating a relationship between the number of clusters and linkage criteria representing a degree of dissimilarity by using a hierarchical clustering method for the plurality of minimum unit clusters,
determine priority of the number of clusters based on curvatures of the function, and
determine the candidates based on the priority of the number of clusters.

7. An analysis method comprising:
acquiring spectrum imaging data in which a position on a sample is associated with a spectrum of a signal from the sample;
performing multivariate analysis on the spectrum imaging data to determine candidates for a number of phases by determining a priority of the number of phases based on results of the multivariate analysis and determining the candidates based on the priority of the number of phases;
creating, for each of the candidates, a phase map group including a number of phase maps corresponding to the number of phases; and
causing a display unit to display, for each of the candidates, the phase map group.

* * * * *